(12) United States Patent
Nishimoto

(10) Patent No.: US 7,388,151 B2
(45) Date of Patent: Jun. 17, 2008

(54) BICYCLE ELECTRICAL WIRING SUPPORT APPARATUS

(75) Inventor: Naohiro Nishimoto, Hashimoto (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 326 days.

(21) Appl. No.: 10/908,967

(22) Filed: Jun. 2, 2005

(65) Prior Publication Data

US 2006/0022425 A1    Feb. 2, 2006

(30) Foreign Application Priority Data

Jul. 28, 2004    (JP) ............................. 2004-220287

(51) Int. Cl.
*H01B 7/18*    (2006.01)
(52) U.S. Cl. .................. 174/68.3; 280/288.4; 307/9.1
(58) Field of Classification Search .............. 174/68.3; 280/288.4; 307/9.1
See application file for complete search history.

(56) References Cited

U.S. PATENT DOCUMENTS

| | | | |
|---|---|---|---|
| 1,035,931 A | 8/1912 | Woodhouse | |
| 2,845,812 A | 8/1958 | Pobar | 74/501 |
| 4,266,439 A | 5/1981 | Hayashi et al. | 74/501 |
| 4,563,542 A * | 1/1986 | Pollack | 174/68.3 |
| 5,105,682 A | 4/1992 | Jung | 74/502.4 |
| 5,215,280 A * | 6/1993 | Tigrett | 248/68.1 |
| 5,661,263 A * | 8/1997 | Salvaggio | 174/68.3 |
| 5,765,446 A | 6/1998 | Patterson et al. | 74/502.4 |
| 5,799,544 A | 9/1998 | Oda | 74/502.4 |
| 5,806,375 A | 9/1998 | Oda | 74/501.5 |
| 5,809,840 A | 9/1998 | Oda et al. | 74/502.6 |
| 5,857,932 A | 1/1999 | Sugimoto | 474/82 |
| 6,014,910 A | 1/2000 | Oda et al. | |
| 6,417,452 B1 * | 7/2002 | Doshita | 174/72 A |
| 6,774,312 B2 * | 8/2004 | Fatato | 174/102 D |
| 6,835,069 B2 | 12/2004 | Kitamura et al. | 439/34 |
| 2006/0211282 A1 * | 9/2006 | Onogi et al. | 439/127 |

FOREIGN PATENT DOCUMENTS

| | | |
|---|---|---|
| DE | 1959956 U | 5/1967 |
| EP | 475194 A1 * | 3/1992 |
| EP | 1426277 A2 | 6/2004 |
| JP | 59-077679 U | 5/1984 |
| JP | 1-188713 A | 7/1989 |
| JP | 3-265707 A | 11/1991 |
| JP | 4-54339 Y2 | 12/1992 |
| JP | 5-084196 A | 4/1993 |
| JP | 5-38245 Y2 | 9/1993 |

(Continued)

OTHER PUBLICATIONS

European search report for EP 05014776, the European patent application that is the equivalent to the application, dated Oct. 26, 2006.

*Primary Examiner*—Kevin Hurley
(74) *Attorney, Agent, or Firm*—James A. Deland

(57) ABSTRACT

A bicycle electrical wiring support apparatus comprises an axially elongated rigid first cover member structured to substantially cover a portion of electrical wiring, and a resilient second cover member that couples to the first cover member for covering a portion of electrical wiring not covered by the first cover member.

18 Claims, 9 Drawing Sheets

FOREIGN PATENT DOCUMENTS

| | | |
|---|---|---|
| JP | 06-099877 A | 4/1994 |
| JP | 6-292317 A | 10/1994 |
| JP | 6-339212 A | 12/1994 |
| JP | 7-046728 A | 2/1995 |
| JP | 7-43840 Y2 | 10/1995 |
| JP | 7-296662 A | 11/1995 |
| JP | 8-243077 A | 2/1996 |
| JP | 9-009454 A | 1/1997 |
| JP | 9-032842 A | 2/1997 |
| JP | 11-007836 A | 1/1999 |
| JP | 2000-195357 A | 7/2000 |
| JP | 2001-126805 A | 5/2001 |
| JP | 2001-200930 A | 7/2001 |
| JP | 2003-139606 A | 5/2003 |
| JP | 2004-105478 A | 4/2004 |
| JP | 2006244743 A * | 9/2006 |
| WO | 93-18565 A1 | 9/1993 |

* cited by examiner

BICYCLE ELECTRICAL WIRING SUPPORT APPARATUS

BACKGROUND OF THE INVENTION

The present invention is directed to bicycles and, more particularly, to a bicycle electrical wiring apparatus.

Bicycles sometimes are equipped with various electrical devices that are distributed along the bicycle frame and are interconnected through appropriate wiring. Such a bicycle is disclosed in U.S. Pat. No. 6,835,069. It is preferable to secure the wiring to the frame so that the wiring does not hang loose and pose a hazard. One method of securing the wiring to the frame is to pass the wiring through the inside of the frame tubes. Such a method makes it possible to obtain a clean external appearance. However, not only is a special structure required to pass the electrical wiring through the inside of the frame tubes, but passing the electrical wiring through the inside of the frame tubes is time-consuming. The special frame structure and the labor intensive nature of passing the wiring through the frame tubes undesirably increases the cost of the bicycle.

Another method of securing the wiring to the frame is simply to attach the wiring to the bicycle frame with a wiring band. Such a method is easy, thus making it possible to reduce the cost of the wiring operations. However, the wiring still tends to sag in an exposed manner between the wiring bands, so it is impossible to obtain a desirable clean appearance. Furthermore, because the sagging wiring is exposed to the outside, the wiring may become caught with other objects. For example, wiring at the lower part of the bicycle may become snagged with objects on the ground during travel and braking.

SUMMARY OF THE INVENTION

The present invention is directed to various features of a bicycle electrical wiring support apparatus. In one embodiment, a bicycle electrical wiring support apparatus comprises an axially elongated rigid first cover member structured to substantially cover a portion of electrical wiring, and a resilient second cover member that couples to the first cover member for covering a portion of electrical wiring not covered by the first cover member. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
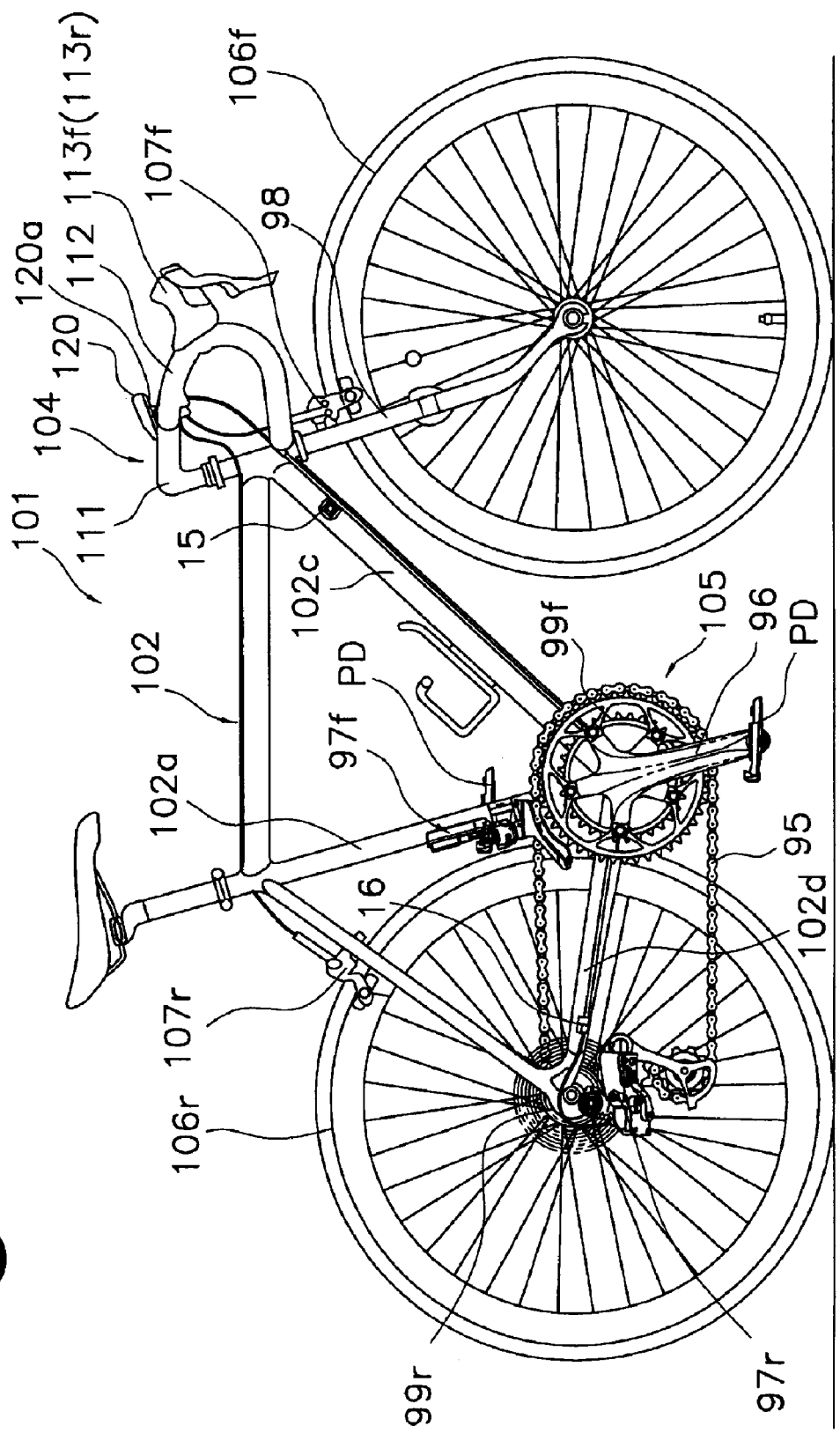
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106$f$ rotatably attached to the lower part of fork 98, a rear wheel 106$r$ rotatably attached to the rear of frame 102, and a drive unit 105. A front wheel brake 107$f$ is provided for braking front wheel 106$f$, and a rear wheel brake 107$r$ is provided for braking rear wheel 106$r$.

Drive unit 105 comprises a chain 95, a front sprocket assembly 99$f$ coaxially mounted with a crank 96 having pedals PD, an electrically controlled front derailleur 97$f$ attached to a seat tube 102$a$ of frame 102, a rear sprocket assembly 99$r$ coaxially mounted with rear wheel 106$r$, and an electrically controlled rear derailleur 97$r$. In this embodiment, front sprocket assembly 99$f$ comprises two sprockets mounted coaxially with crank 96, and rear sprocket assembly 99$r$ comprises ten sprockets mounted coaxially with rear wheel 106$r$. Front derailleur 97$f$ moves to two operating positions to switch chain 95 between the two front sprockets, and rear derailleur 97$r$ moves to ten operating positions to switch chain 95 among selected ones of the ten rear sprockets.

Figure 2:
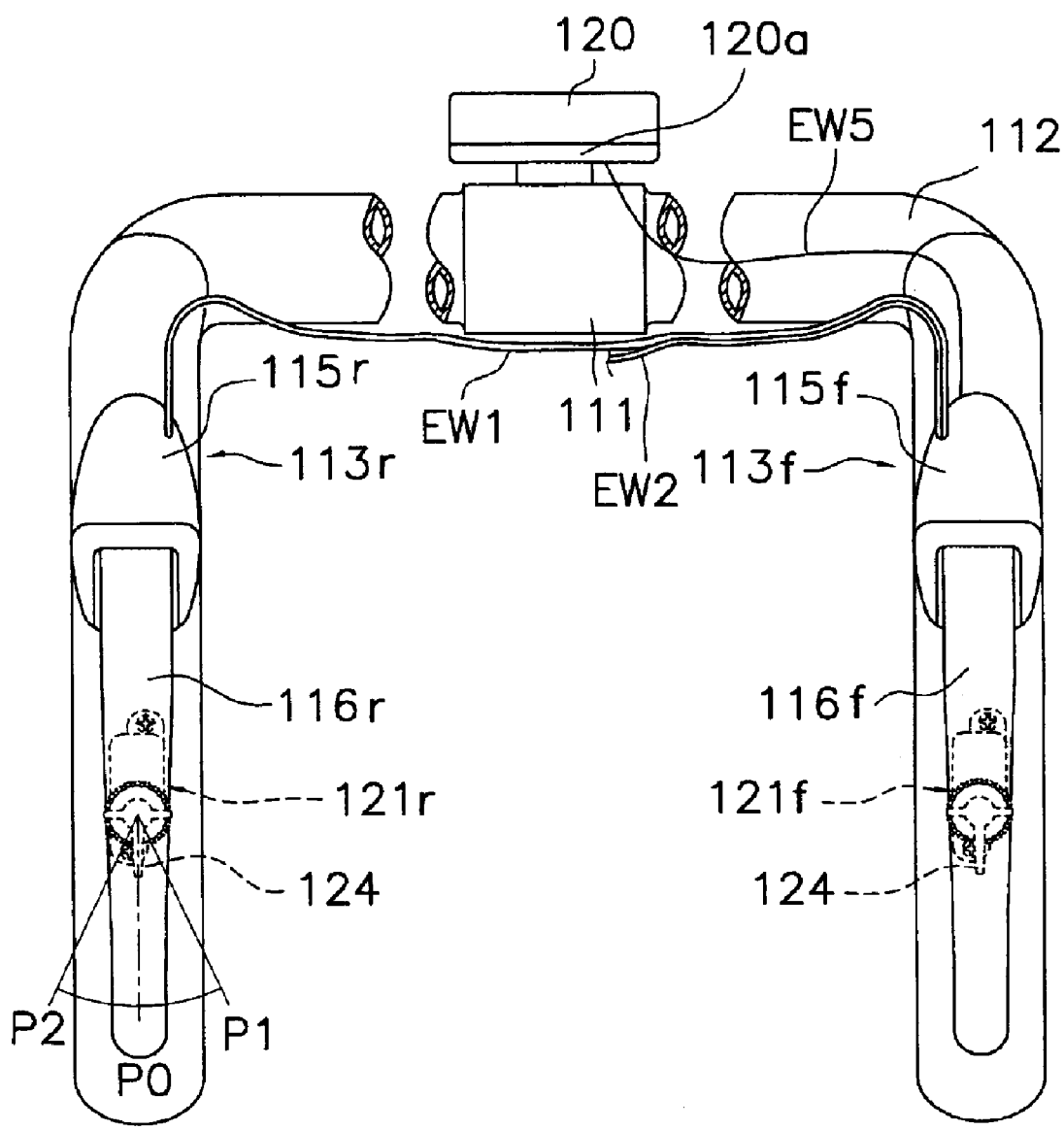
FIG. 2 is a front view of a particular embodiment of components mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113$f$ and 113$r$ are mounted at opposite sides of handlebar 112. Brake lever assembly 113$f$ controls the operation of front wheel brake 107$f$, and brake lever assembly 113$r$ controls the operation of rear wheel brake 107$r$. A display unit 120 is detachably mounted to a display unit bracket 120$a$ attached to a central portion of handlebar 112. Display unit 120 displays the speed of the bicycle, distance traveled, gear position, etc. in a known manner.

Brake lever assemblies 113$f$ and 113$r$ comprise respective brake brackets 115$f$ and 115$r$ mounted to the forward curved portions of handlebar 112, and respective brake levers 116$f$ and 116$r$ pivotably mounted to brake brackets 115$f$ and 115$r$. A rear shift control device 121$r$ with a switch lever 124 is mounted to the rear side of brake lever 116$r$ so that the rider may control the operation of rear derailleur 97$r$ with the hand grasping brake lever 116$r$. The switch lever 124 mounted to the rear of brake lever 116$r$ rotates laterally inward from a home position P0 to a first position P1 and rotates laterally outward from home position P0 to a second position P2 to control the operation of rear derailleur 97$r$. Similarly, a front shift control device 121$f$ with a switch lever 124 is mounted to the rear side of brake lever 116$f$ so that the rider may control the operation of front derailleur 97$f$ with the hand grasping brake lever 116$f$. The switch lever 124 mounted to the rear of brake lever 116$f$ also rotates laterally inward from a home position P0 to a first position P1 and rotates laterally outward from home position P0 to a second position P2 to control the operation of front derailleur 97f. The levers 124 in front shift control device 121f and rear shift control device 121r are biased to their respective home positions P0.

A front upshift switch 130f (FIG. 4) and a front downshift switch 131f are mounted in front shift control device 121f. Front upshift switch 130f operates when switch lever 124 in front shift control device 121f rotates from position P0 to position P1, and front downshift switch 131f operates when switch lever 124 in front shift control device 121f rotates from position P0 to position P2. Similarly, a rear upshift switch 130r and a rear downshift switch 131r are mounted in rear shift control device 121r. Rear upshift switch 130r operates when switch lever 125 in rear shift control device 121r rotates from position P0 to position P1, and rear downshift switch 131r operates when switch lever 124 in rear shift control device 121r rotates from position P0 to position P2. Of course, many different switch combinations that operate in many different ways may be provided to suit different applications.

Figure 3:
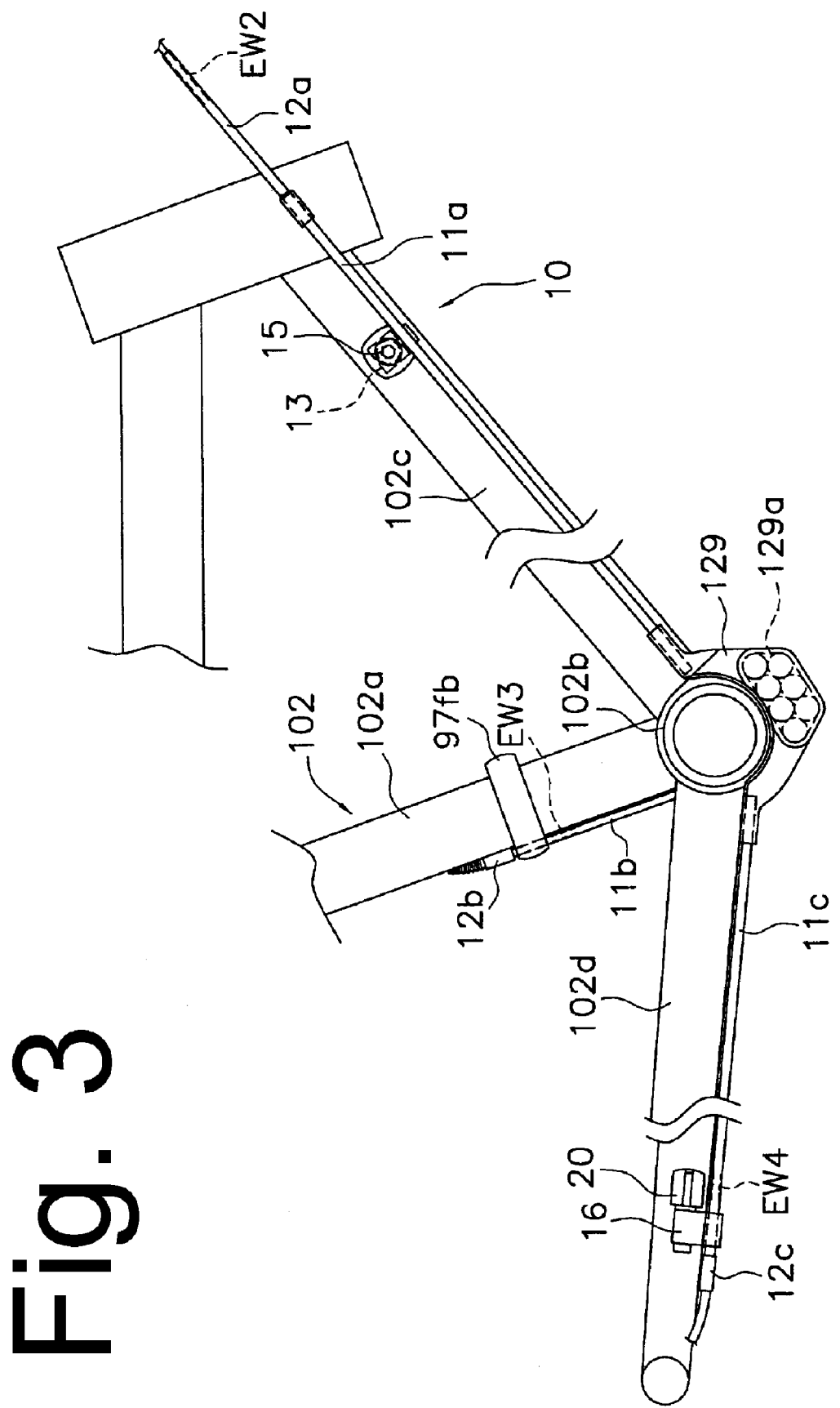
FIG. 3 is a side view of electrical wiring mounted to the bicycle frame.
Figure 4:
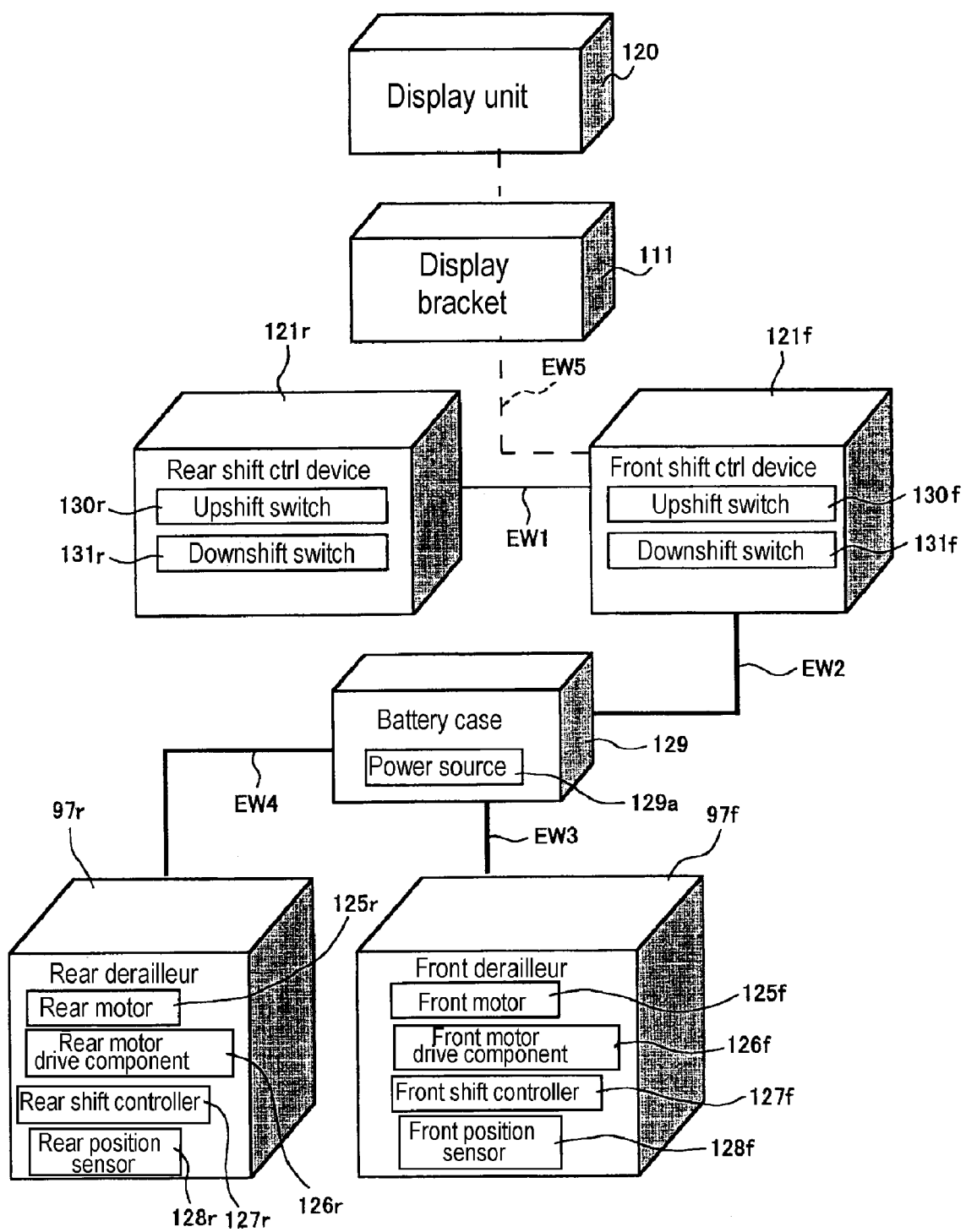
FIG. 4 is a block diagram of an electrically operated bicycle control system.

As shown in FIG. 4, front derailleur 97f comprises a front derailleur motor 125f, a front motor drive component 126f for driving front derailleur motor 125f, a front shift controller 127f comprising a programmed microprocessor and other electronic components for controlling the position of front derailleur 97f in response to signals received from front shift control device 121f, and a front position sensor 128f that senses the operating position of front derailleur 97f. Similarly, rear derailleur 97r comprises a rear derailleur motor 125r, a rear motor drive component 126r for driving rear derailleur motor 125r, a rear shift controller 127r comprising a programmed microprocessor and other electronic components for controlling the positioning of rear derailleur 97r in response to signals received from rear shift control device 121r, and a rear position sensor 128r that senses the operating position of rear derailleur 97r. A power source 199a in the form of a primary or secondary battery or some other power source is housed in a battery case 129 attached to the bottom bracket 102b (FIG. 3) of frame 102. Power source 129a powers front and rear derailleurs 97f and 97r as well as other electrical components described herein in a known manner.

As shown in FIGS. 1-4, front and rear derailleurs 97f and 97r, front and rear shift control devices 121f and 121r, display unit 120 and battery case 129 are mounted at various positions on bicycle 101 and are interconnected by five electrical wire assemblies EW1-EW5. Electrical wire assembly EW1 extends from rear shift control device 121r to front shift control device 121f, electrical wire assembly EW2 extends from front shift control device 121f to battery case 129, electrical wire assembly EW3 extends from battery case 129 to front derailleur 97f, electrical wire assembly EW4 extends from battery case 129 to rear derailleur 97r, and electrical wire assembly EW5 extends from front shift control device 121f to display unit bracket 120a.

In this embodiment, electrical wire assembly EW1 carries shift control signals from rear shift control device 121r and may comprise a three wire cable that may be partially taped to handlebar 112. Electrical wire assembly EW2 carries shift control signals from front shift control device 121f and rear shift control device 121r as well as the operating position signals from front position sensor 128f and rear position sensor 128r. Electrical wire assembly EW2 may comprise a five or six wire cable. The portion of electrical wire assembly EW2 in proximity to front brake lever assembly 113f may be partially taped to handlebar 112. Electrical wire assembly EW3 carries shift control signals from front shift control device 121f and front derailleur position signals from front position sensor 128f. Similarly, electrical wire assembly EW4 carries shift control signals from rear shift control device 121r and rear derailleur position signals from rear position sensor 128r. Each electrical wire assembly EW3 and EW4 may comprise a four wire cable. Electrical wire assembly EW5 carries front and rear derailleur position signals from front and rear position sensors 128f and 128r. Electrical wire assembly EW5 may comprise a five or six wire cable that may be partially taped to handlebar 112. Display unit 120 uses the signals received on electrical wire assembly EW5 to display the current operating position of front derailleur 97f and rear derailleur 97r to the rider.

FIG. 3 is a side view of electrical wire assemblies EW2-EW4 mounted to frame 102 using an overall electrical wiring support structure 10. In this embodiment, electrical wire assembly EW2 is supported to a down tube 102c of frame 102 by a straight rigid first cover member 11a, a flexible and relatively soft second cover member 12a, and a first coupler 15, wherein a lower end portion of first cover member 11a is inserted into battery case 129. Electrical wire assembly EW3 is supported to seat tube 102a of frame 102 by a straight rigid first cover member 11b, a flexible and relatively soft second cover member 12b, and a front derailleur bracket 97fb, wherein a lower end portion of first cover member 11b is inserted into battery case 129. Electrical wire assembly EW4 is supported to a chain stay 102d of frame 102 by a straight rigid first cover member 11c, a flexible and relatively soft second cover member 12c, and a second coupler 16, wherein a forward end portion of first cover member 11c is inserted into battery case 129.

Figure 5:
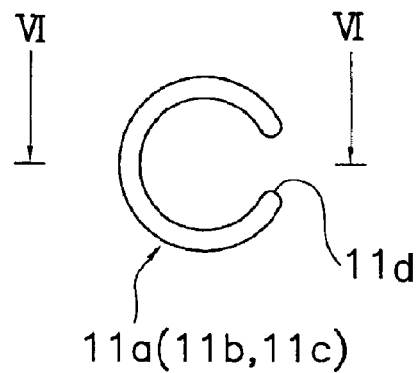
FIG. 5 is a front view of a particular embodiment of a first cover member.
Figure 6:
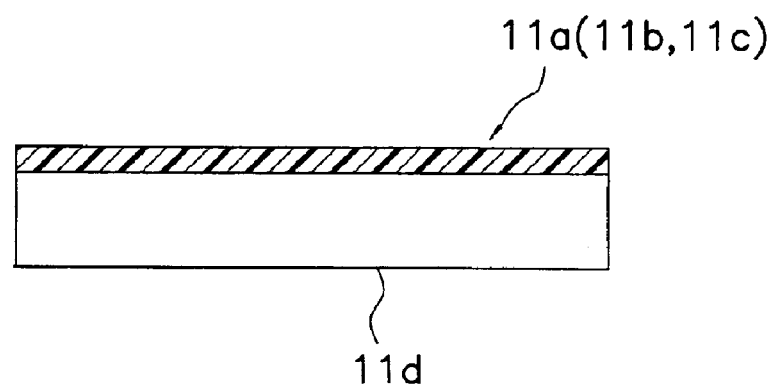
FIG. 6 is a view taken along line VI-VI in FIG. 5.

First cover members 11a-11c may be fabricated from a hard, relatively resilient, break-resistant material such as polyacetal resin. As shown in FIGS. 5 and 6, each first cover member 11a-11c has a generally cylindrical tubular shape and has a slot 11d extending along its entire length. As a result, each first cover member 11a-11c has a substantially C-shaped cross-section. Electrical wire assemblies EW2-EW4 are supported within and substantially covered by their respective first cover members 11a-11c.

Figure 7:
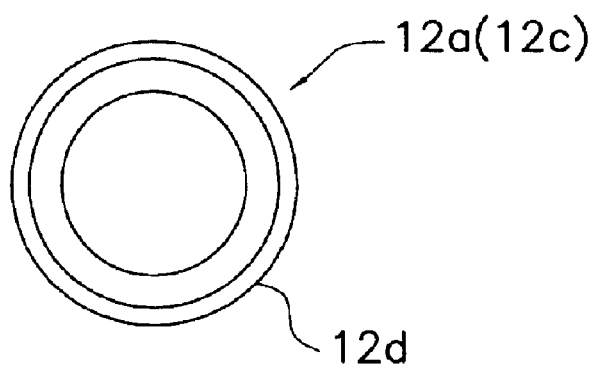
FIG. 7 is a front view of a particular embodiment of a second cover member.
Figure 8:
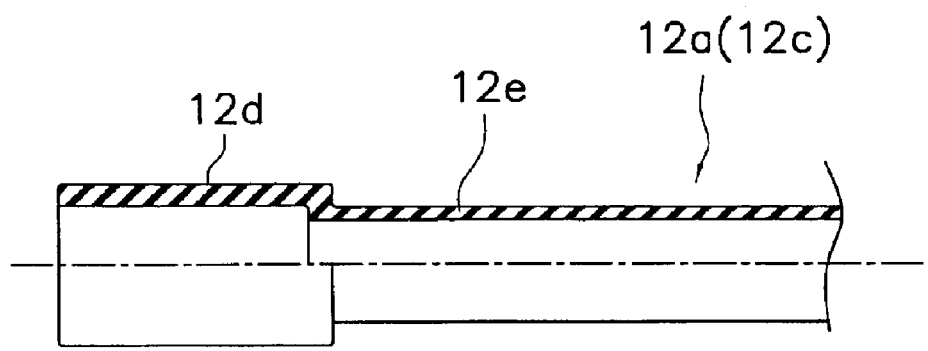
FIG. 8 is a partial cross-sectional view of the second cover member.

Each second cover member 12a-12c may be fabricated from a flexible and soft material such as a rubber synthetic resin. In this embodiment, second cover members 12a and 12c have the same construction. As shown in FIGS. 7 and 8, each second cover member 12a and 12c comprises a substantially cylindrical tubular attachment part 12d and a substantially cylindrical tubular extension part 12e. Attachment part 12d is structured to elastically attach around an end of its corresponding first cover member 11a and 11c, and extension part 12e extends from attachment part 12d. A diameter of extension part 12e is less than a diameter of attachment part 12d. Electrical wire assemblies EW2 and EW4 are supported within and covered by their respective second cover members 12a and 12c.

Figure 9:
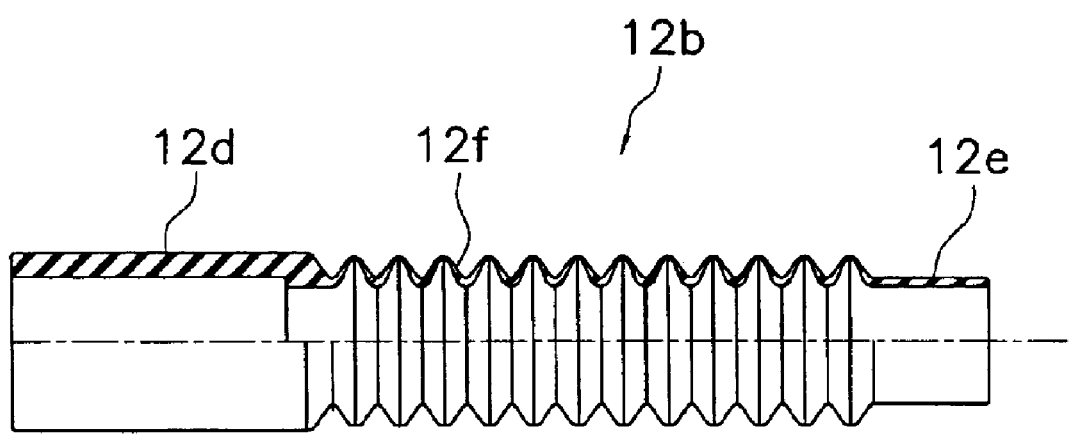
FIG. 9 is a partial cross sectional view of another embodiment of a second cover member.

Second cover member 12b also may be fabricated from a flexible and soft material, but it has a slightly different shape from second cover members 12a and 12c. As shown in FIG. 9, second cover member 12b comprises a substantially cylindrical tubular attachment part 12d and a substantially cylindrical tubular extension part 12e, wherein a diameter of extension part 12e is less than a diameter of attachment part 12d as in the first embodiment. However, in this embodiment, an undulating extension part 12f extends from attachment part 12d between attachment part 12d and extension part 12e. Electrical wire assembly EW3 is supported within and covered by second cover member 12b.

Figure 10:
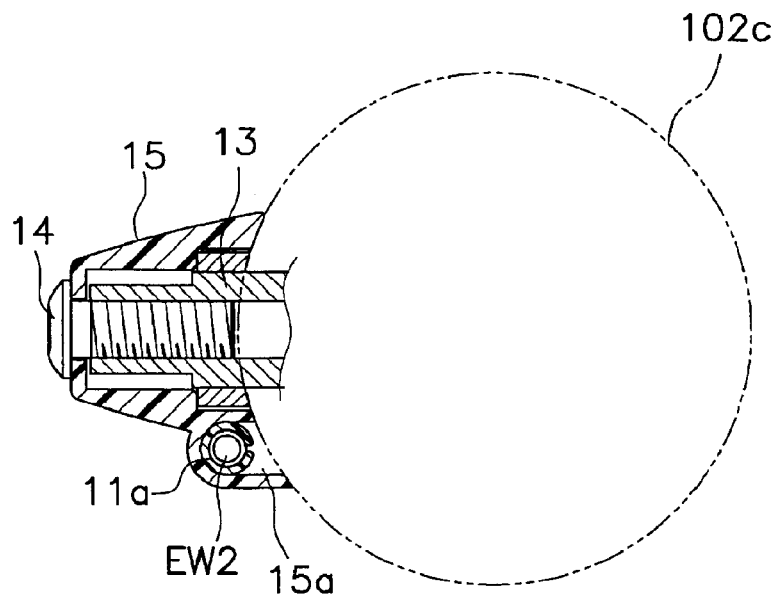
FIG. 10 is a cross sectional view of a particular embodiment of a coupler.

As shown in FIG. 3, the upper portion of first cover member 11a, which covers electrical wire assembly EW2, is attached to down tube 102c by first coupler 15. As shown in FIG. 10, first coupler 15 is attached to down tube 102c by a fastening bolt 14 that mates with a fastening nut 13 that extends through down tube 102c. First coupler 15 has the shape of a truncated square pyramid that widens towards the base, wherein the bottom surface of the base follows the curved surface of down tube 102c. First coupler 15 has a hollow portion that houses fastening nut 13 therein. A U-shaped attachment portion 15a is disposed at the bottom of first coupler 15 and elastically engages first cover member 15a.

Figure 11:
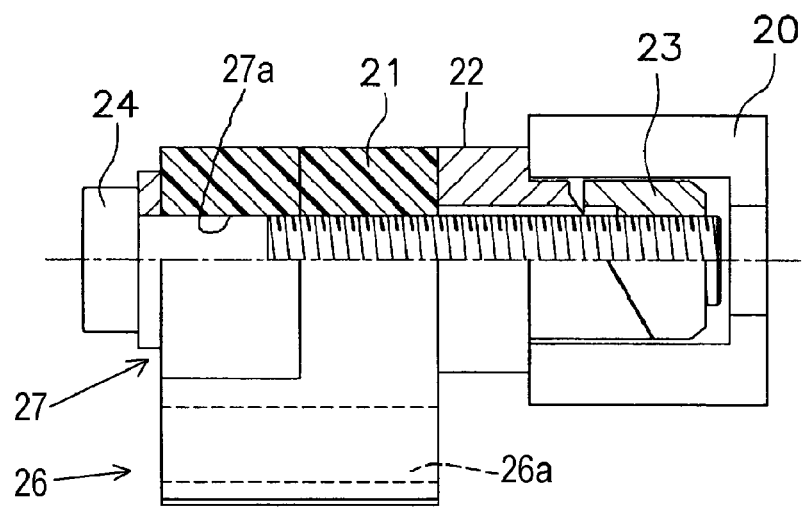
FIG. 11 is a cross sectional view of another embodiment of a coupler.

As shown in FIG. 3, the rear portion of first cover member 11c, which covers electrical wire assembly EW4, is attached to chain stay 102d by second coupler 16. Second coupler 16 is detachably fitted in a cable terminating component 20 ordinarily used for terminating the outer casing of a conventional Bowden cable. As shown in FIG. 11, second coupler 16 comprises a support member 21 for supporting first cover member 11c, a resilient taper ring 22 for attaching support member 21 to cable terminating component 20, a taper nut 23 that contacts the tapered surface of taper ring 22, and a fastener bolt 24. Fastener bolt 24 passes through support member 21 and taper ring 22 and screws into taper nut 23. When fastener bolt 24 is screwed into taper nut 23, taper ring 22 expands radially outward to secure second coupler 16 to cable terminating component 20, thereby attaching first cover member 11c to chain stay 102d.

Figure 12:
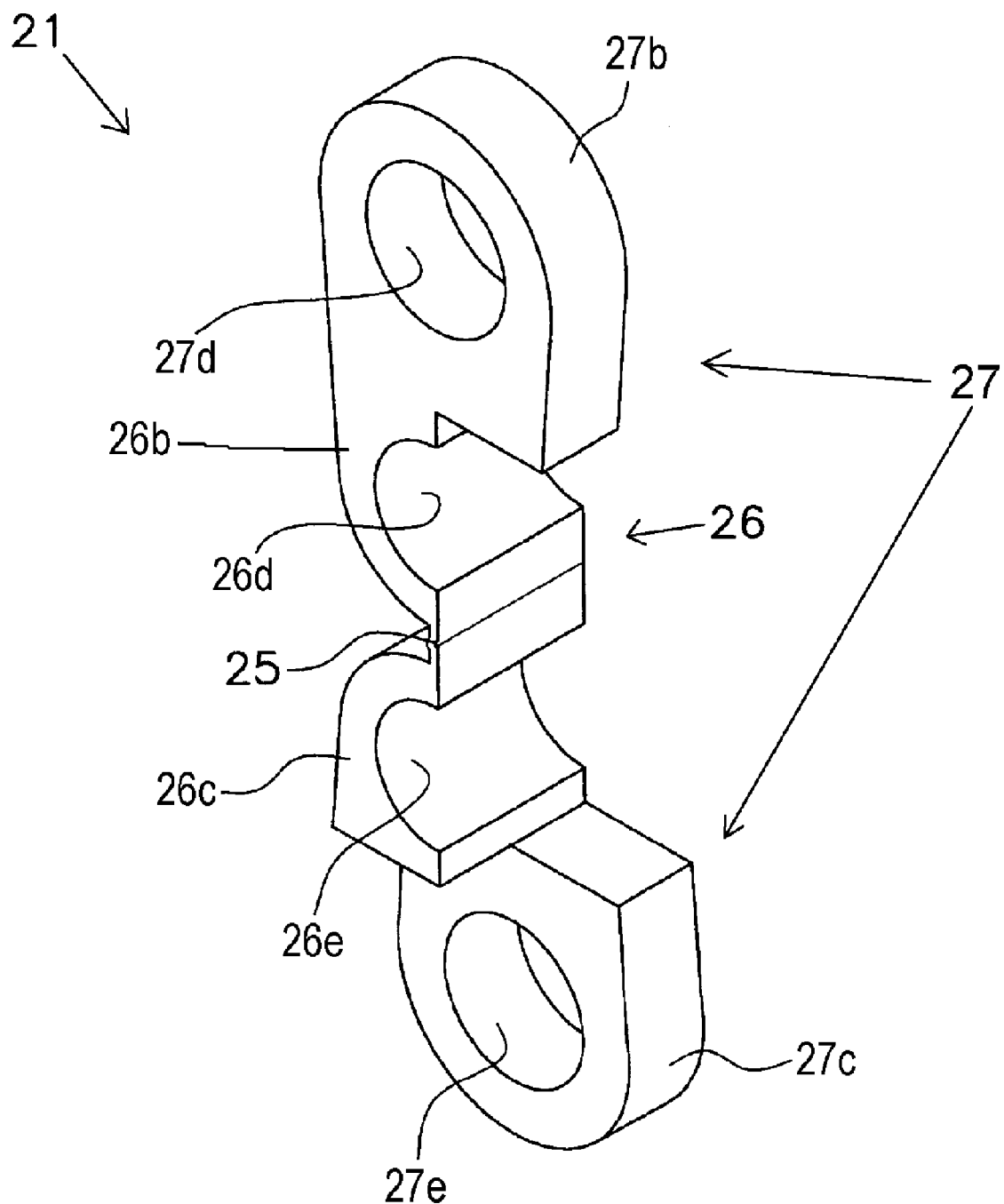
FIG. 12 is an oblique view of the support member shown in FIG. 10.

Support member 21 may be fabricated from a relatively soft synthetic resin such as polypropylene, for example, that is folded to produce the structure shown in FIG. 11. FIG. 12 shows support member 21 in its unfolded state. As shown in FIGS. 11 and 12, support member 21 comprises a central folding portion 25, a first portion 26 that forms a first cover member opening 26a, and a second portion 27 that forms a fastener opening 27a for receiving fastener bolt 24 therethrough. In this embodiment, a diameter of first cover member opening 26a is less than a diameter of first fastener opening 27a. Also, the diameter of first cover member opening 26a is slightly smaller than a diameter of first cover member 11c to firmly hold first cover member 11c.

First portion 26 comprises a first segment 26b and a second segment 26c, wherein first segment 26b folds relative to second segment 26c about central folding portion 25 to form first cover member opening 26a. First and second segments 26b and 26c have respective first and second concave surfaces 26d and 26e that face each other when support member 21 is in the folded state to form first cover member opening 26a. Second portion 27 comprises a first segment 27b and a second segment 27c, wherein first segment 27b folds relative to second segment 27c about central folding portion 25 to form first fastener opening 27a. First and second segments 27b and 27c have respective circular openings 27d and 27e formed therein. First and second segments 27b and 27c are disposed axially adjacent to each other when support member 21 is in the folded state so that openings 27d and 27e are aligned with each other to form first fastener opening 27a.

During operation of the bicycle, when front derailleur 97f is in the low-speed position, operating front shift control device 121f to turn on front upshift switch 130f causes an upshift signal to be communicated to battery case 129 through electrical wire assembly EW2 and then to front derailleur 97f through electrical wire assembly EW3. Front shift controller 127f then provides signals to front derailleur motor drive component 126f to drive front derailleur motor 125f to move front derailleur 97f to the high speed position. Similarly, when front derailleur 97f is in the high-speed position, operating front shift control device 121f to turn on front downshift switch 131f causes a downshift signal to be communicated to front derailleur 97f through electrical wire assemblies EW2 and EW3. Front shift controller 127f then provides signals to front derailleur motor drive component 126f to drive front derailleur motor 125f to move front derailleur 97f to the low speed position.

When rear derailleur 97r is in a lower-speed position, operating rear shift control device 121r to turn on rear upshift switch 130r causes an upshift signal to be communicated to battery case 129 through electrical wire assemblies EW1 and EW2 and then to rear derailleur 97f through electrical wire assembly EW4. Rear shift controller 127r then provides signals to rear derailleur motor drive component 126r to drive rear derailleur motor 125r to move rear derailleur 97r to a higher speed position. Similarly, when rear derailleur 97r is in a higher speed position, operating rear shift control device 121r to turn on rear downshift switch 131r causes a downshift signal to be communicated to rear derailleur 97r through electrical wire assemblies EW1, EW2 and EW4. Rear shift controller 127r then provides signals to rear derailleur motor drive component 126r to drive rear derailleur motor 125r to move rear derailleur 97r to a lower speed position.

During the above operations, operating position signals from front and rear position sensors 128f and 128r are communicated to display unit 120 through electrical wire assemblies EW2-EW5 as appropriate, and display unit 120 displays the current operating positions of front and rear derailleurs 97f and 97r.

It should be readily apparent from the above description that electrical wire assemblies EW2-EW4 are disposed in a straight line along frame 102 by the rigid first cover members 11a-11c. The parts of electrical wire assemblies EW2-EW4 that do not go along the frame 102 can be bent freely by the soft second cover members 12a-12c. As a result, electrical wire assemblies EW2-EW4 do not sag and are not exposed to the outside, thus minimizing any reduction in visual appeal of the bicycle and minimizing risk of damage to the wires.

While the above is a description of various embodiments of inventive features, further modifications may be employed without departing from the spirit and scope of the present invention. For example, while a slot 11d extended axially along the entire length of the first cover members 11a-11c, slot 11d may be formed along only a portion of the length of first cover members 11a-11c. While first cover members 11a-11c were formed from a polyacetal resin, which is hard and tough, other materials may be used, such as metal or a carbon fiber reinforced resin. While second cover members 12a-12c were formed from a rubber synthetic resin, which is soft and flexible, other materials may be used, such as polyethylene and polypropylene. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle electrical wiring support apparatus comprising:
   an axially elongated rigid first cover member structured to substantially cover a portion of electrical wiring;
   wherein the first cover member includes an axially extending slot; and
   a resilient second cover member that couples to the first cover member for covering a portion of electrical wiring not covered by the first cover member;
   wherein at least a portion of the second cover member has a continuous circumferential side wall for completely surrounding the electrical wiring.

2. The apparatus according to claim 1 wherein the first cover member has a substantially cylindrical shape.

3. The apparatus according to claim 1 wherein a portion of the first cover member has a substantially C-shaped cross section.

4. The apparatus according to claim 1 wherein the slot extends a majority of an entire length of the first cover member.

5. The apparatus according to claim 4 wherein the slot extends the entire length of the first cover member.

6. The apparatus according to claim 5 wherein the first cover member has a substantially C-shaped cross section.

7. The apparatus according to claim 1 wherein the first cover member is substantially straight for substantially its entire length.

8. The apparatus according to claim 1 wherein the second cover member comprises:
   a substantially cylindrical attachment part structured to attach to an end of the first cover member; and
   an undulating extension part extending from the attachment part.

9. The apparatus according to claim 1 wherein the second cover member comprises:
   a substantially cylindrical attachment part structured to attach to an end of the first cover member; and
   a substantially cylindrical extension part extending from the attachment part;
   wherein a diameter of the extension part is less than a diameter of the attachment part.

10. The apparatus according to claim 1 further comprising a coupler that couples the first cover member to a bicycle frame.

11. The apparatus according to claim 10 wherein the coupler comprises a first portion that forms a first cover member opening to support the first cover member.

12. The apparatus according to claim 11 wherein the first portion comprises a first segment and a second segment, wherein the first segment folds relative to the second segment to form the first cover member opening.

13. The apparatus according to claim 12 wherein the first segment faces the second segment to form the first cover member opening.

14. The apparatus according to claim 12 wherein the first segment comprises a first concave surface, wherein the second segment comprises a second concave surface, and wherein the first and second concave surfaces face in opposite directions to form the first cover member opening.

15. The apparatus according to claim 14 wherein the first concave surface faces the second concave surface to form the first cover member opening.

16. The apparatus according to claim 11 wherein the coupler comprises a second portion that forms a fastener opening to receive a fastener therethrough to attach the coupler to the bicycle frame.

17. The apparatus according to claim 16 wherein the second portion comprises a first segment and a second segment, wherein the first segment folds relative to the second segment to form the fastener opening.

18. The apparatus according to claim 17 wherein the first segment is positioned axially adjacent to the second segment to form the fastener opening.

* * * * *